United States Patent [19]

Blass et al.

[11] Patent Number: 5,268,157

[45] Date of Patent: Dec. 7, 1993

[54] PROCESS FOR THE PRODUCTION OF CATALYTIC GAS PERMEABLE NETS AND PROCESS FOR OXIDIZING AMMONIA

[75] Inventors: Siegfried Blass, Alzenau; Horst Duebler, Hanau; Thomas Stoll, Reutlingen, all of Fed. Rep. of Germany

[73] Assignee: Degussa Aktiengesellschaft, Frankfurt am Main, Fed. Rep. of Germany

[21] Appl. No.: 851,020

[22] Filed: Mar. 13, 1992

[30] Foreign Application Priority Data

Mar. 16, 1991 [DE] Fed. Rep. of Germany ....... 4108652
Feb. 28, 1992 [DE] Fed. Rep. of Germany ....... 4206199

[51] Int. Cl.$^5$ .................... B01J 23/40; B01J 23/72; B01J 23/89; C01B 21/26
[52] U.S. Cl. ................. 423/403; 423/392; 502/326; 502/331; 502/339
[58] Field of Search ............ 502/326, 331, 339; 423/392, 403

[56] References Cited

U.S. PATENT DOCUMENTS

| | | | |
|---|---|---|---|
| 1,927,963 | 9/1933 | Taylor | 502/339 |
| 3,189,563 | 6/1965 | Hauel | 252/460 |
| 3,881,877 | 5/1975 | Hunter | 423/392 |

FOREIGN PATENT DOCUMENTS

| | | |
|---|---|---|
| 0077121 | 4/1983 | European Pat. Off. . |
| 0259966 | 3/1988 | European Pat. Off. . |
| 0364153 | 4/1990 | European Pat. Off. . |
| 1594716 | 11/1969 | Fed. Rep. of Germany . |
| 2248811 | 5/1973 | Fed. Rep. of Germany . |
| 2829035 | 1/1980 | Fed. Rep. of Germany . |
| 2855102 | 7/1980 | Fed. Rep. of Germany . |
| 771524 | 7/1988 | France . |
| 2062486 | 5/1981 | United Kingdom . |

OTHER PUBLICATIONS

German language, DIN 62 125, Aug. 1985, pp. 1, 3 and 5 with translation.
German language technical description entitled "Knitting Technique", pp. 25–27, date unknown (translation included).
German language technical article entitled "Knitting Technique", pp. 3, 18 and 19, date unknown (translation included).

*Primary Examiner*—W. J. Shine
*Attorney, Agent, or Firm*—Beveridge, DeGrandi, Weilacher & Young

[57] ABSTRACT

Wires of platinum containing 4 to 12% rhodium or 4 to 12% of palladium and rhodium (4 to 12% being in reference to the sum of palladium and rhodium and not the percent values for each individually) and wires of palladium containing 2 to 15% nickel or 2 to 15% copper or 2 to 15% of nickel and copper (2 to 15% being in reference to the sum of nickel and copper) and having a diameter of 50 to 120 μm, a tensile strength of 900 to 1050 N/mm$^2$ and an elastic limit of 0.5 to 3% are used for the knitting of round nets for use as catalysts in the oxidation of ammonia and as recovery nets for platinum metals. A flat knitting machine with a gauge of 3.63 to 1.81 mm is also used whereby the loop length is 2 to 6 mm and wherein the loop or width gauge corresponds with the knitting machine gauge so as to provide a loop width of 1.81 to 3.63 mm.

29 Claims, 1 Drawing Sheet

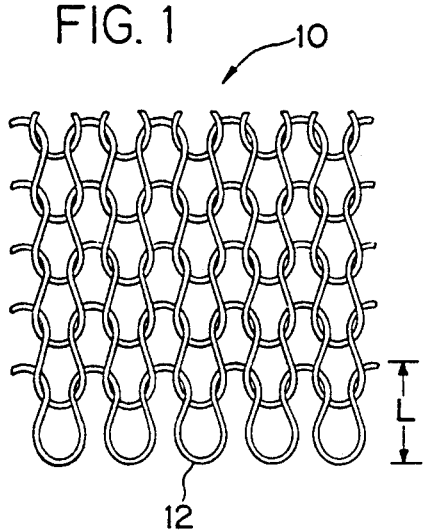
FIG. 1
FIG. 2
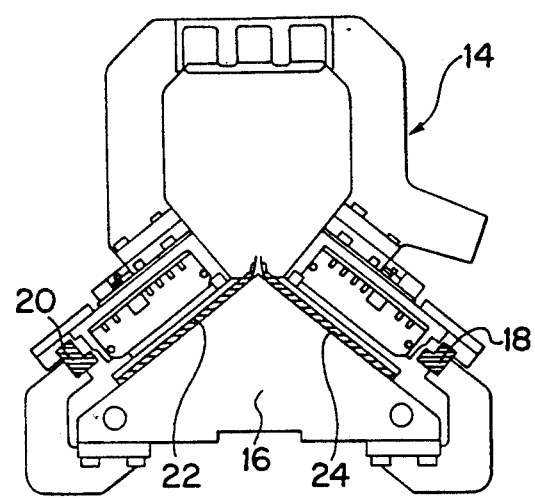
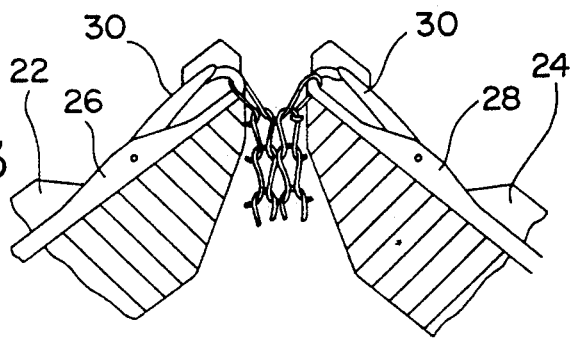
FIG. 3
FIG. 4
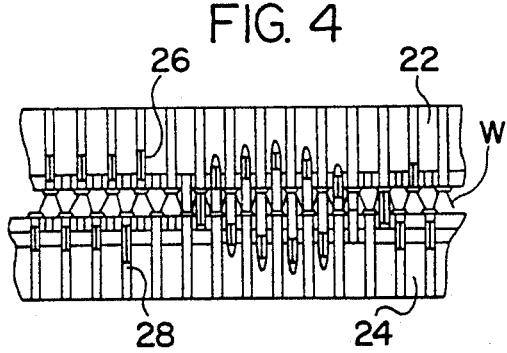
FIG. 5
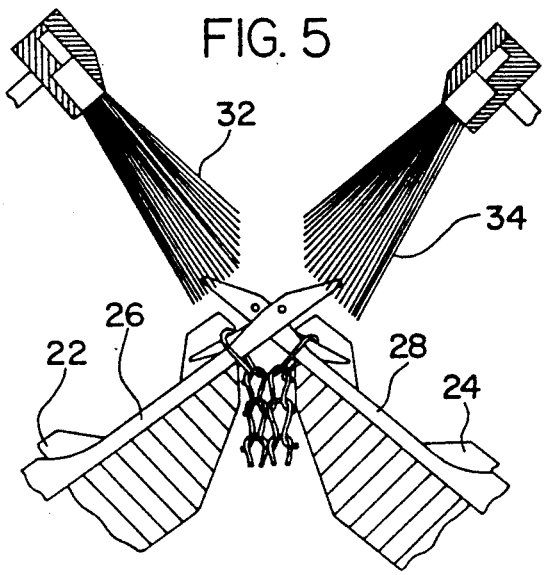

PROCESS FOR THE PRODUCTION OF CATALYTIC GAS PERMEABLE NETS AND PROCESS FOR OXIDIZING AMMONIA

FIELD OF THE INVENTION

This invention relates to a process for the production of gas-permeable nets of noble metals for catalytic processes and the products produced by that process. More particularly, the present invention relates to a process for producing a product used for the catalytic oxidation of ammonia with air or for recovery of the platinum metals which volatilize in the catalytic oxidation of ammonia. The process includes the knitting of wires of platinum or palladium alloys on knitting machines.

BACKGROUND OF THE INVENTION

The use of noble metal catalysts in the form of gas-permeable nets is an established method of operating certain catalytic processes with optimal yields. A well-known example is the use of platinum/rhodium catalyst nets in the oxidation of ammonia for the production of nitric acid.

The net form of the catalysts affords several advantages over other catalyst configurations. For example, the net form provides for large surface development coupled with high mechanical strength. In wire drawing and wire weaving, manufacturers have established production methods for processing the catalytically active metals and metal alloys. These catalyst nets are made in web form on looms and are cut to size in circular form in accordance with the dimensions of the oxidation plants. This results in the accumulation of considerable noble metal waste which has to be reprocessed.

However, nets have the advantage that, with their loops, they form a homogeneous structure of metal wires and free throughflow openings for the reaction gases.

There are no inhomogeneities, for example in the form of seams or welds which impede uniform gas flow.

Nets made in the same way are also used in the recovery of noble metals, for example in the oxidation of ammonia. A large part of the noble metals which volatilize from the platinum/rhodium catalyst nets during the process is collected in nets of palladium alloys.

Woven nets have a number of disadvantages attributable to their production process, including the time required to set up the loom, weaving in considerable lengths and cutting out of the circular nets from rectangular webs with approximately 35% waste.

High production costs are incurred by long set-up times and the high percentage of waste and by the large amounts of expensive noble metals tied up on the loom which necessitates considerable capital outlay.

The woven nets can also be replaced by other gas-permeable configurations. For example, perforated metal foils and metal fiber nonwovens (DE-PS 15 94 716), metal felts (DE-PS 28 29 035) or folded tubular wire nets (DE-OS 22 48 811) are known.

However, these configurations have never been successfully used in practice, above all because they adversely affect the flow conditions prevailing in the reaction zone.

Knitted nets have recently been mentioned in connection with the recovery of noble metals in the oxidation of ammonia (ES-PS 0 077 121). However, no particulars of their form or production are provided.

EP-OS 0 364 153 describes a process for the production of nets of noble metal alloys, more particularly for the catalytic oxidation of ammonia and the recovery of noble metals, in which wires of noble metal alloys are knitted together with an auxiliary thread of natural fibers or a synthetic material on a knitting machine. Pure noble metal alloy wires cannot be knitted without auxiliary threads because the wires break and tear during the knitting process, the tensile strength, wire diameter, ductility and surface friction factor of the material being said to play a part. The disadvantage of including an auxiliary thread in the knitting process is that it has to be removed before the nets are used, which can be done by burning or dissolving. Both methods are too complicated and can lead to contamination of the metal alloys which can adversely affect their catalytic activity or recovery level.

SUMMARY OF THE INVENTION

Accordingly, the problem addressed by the present invention was to provide a process for the production of gas-permeable nets of noble metals for catalytic processes, particularly for the catalytic oxidation of ammonia or for recovery of the platinum metals which volatilize in the catalytic oxidation of ammonia, by knitting of wires of platinum or palladium alloys on knitting machines, in which no auxiliary thread would have to be knitted and in which weights per unit area of 300 $g/m^2$ or more (required for particular processes) could still be achieved.

According to the present invention, the solution to this problem is provided by a process wherein wires of platinum and rhodium alloys containing 4 to 12% by weight of rhodium or wires of platinum-palladium-rhodium alloys containing 4 to 12% by weight of palladium and rhodium, or wires of palladium and nickel alloys containing 2 to 15% by weight of nickel, or wires of palladium-copper alloys containing 2 to 15% by weight of copper, or palladium-nickel-copper alloys containing 2 to 15% by weight of nickel and copper are used. The process involves the knitting of wires having a diameter of 50 to 120 $\mu m$, a tensile strength of 900 to 1500 $N/mm^2$ and an elastic limit of 0.5 to 3%. The knitting of the wires is preferably done using a flat knitting machine having a gauge value between 3.63 and 1.81 mm and a loop length (or sinking depth) between 2 and 6 mm.

According to DIN 60917 the term "gauge" relates to the distance between the middle or center of two adjacent needles of the same needle carrier. The gauge of 3.63 and 1.81 mm corresponds to a needle number (number of needles) of between 7 and 14 per inch (25.4 mm).

The general working principles of a flatbed knitting machine is described in DIN 62125.

BRIEF DESCRIPTION OF THE DRAWINGS

FIG. 1 shows an expanded, cut-away view of the loop formation of one possible embodiment of the knitted net;

FIG. 2 shows a flatbed knitting machine;

FIG. 3 shows a somewhat schematic view of needles of a flatbed knitting machine in ground position;

FIG. 4 shows a somewhat schematic view of needles of a flatbed knitting machine in a catch or tuck position; and FIG. 5 shows an overview of a needlebed which forms part of the flatbed knitting machine.

DETAILED DESCRIPTION OF THE DRAWINGS

FIG. 1 shows a cut-away view of a portion of net 10 which, for this particular embodiment of the invention, shows an upper side of a right left-single wire knitted net. The entire net is preferably formed as a circular net or, for certain applications, is formed as a hexagonal net. The desired shape can be achieved using known flatbed knitting techniques such that there is avoided any requirement for cutting the net. An advantage of the flatbed knitting machine thus lies in the fact that the netting can be knitted in "full fashion", i.e., in final form which, for preferred embodiments, is a circular form or (for less common purposes) is a hexagonal shape. In the case of circular knitting machines, tubular knitting is manufactured which needs to be cut into circular form and therefore is associated with high levels of waste.

Net 10 includes selvedge edge 12 which is defined by an outer row of looped or bent wire. The selvedge edge preferably extends continuously about the periphery of the net. Net 10 has loop length "L" which is preferably about 2 to 6 mm in length.

FIGS. 2-5 illustrate a flatbed knitting machine 14 which includes needlebed support or carrier 16 with carriage side rails 18, 20 and front needlebed 22 and rear needlebed 24. Needles 26 and 28 slide respectively within grooves formed in the needlebeds 22 and 24. Needles 26 and 28 include latches 30. Brushes 32 and 34 act to retain latches open during the insertion of wire W (FIG. 5) during the knitting operation. The knitting of the wire is carried using typical flatbed knitting techniques such as the right-left-single wire knitting technique which results in the loop arrangement shown in FIG. 1.

In many cases, it is of advantage to knit two (double form) or more wires together.

Providing these wire and knitting machine parameters are observed, nets having satisfactorily formed loops can be knitted—surprisingly without auxiliary threads—from platinum/rhodium wires, for example containing 10% by weight rhodium, or from palladium/nickel wires, for example containing 5% by weight nickel, and do not produce any inhomogeneities when used in gas streams.

Wire breaks are not discernible or do not occur during the knitting process. Weights per unit area of more than 300 g/m$_2$ can readily be achieved.

As noted above, the use of flat knitting machines affords the advantage that the knitted nets can be directly made in their final dimensions, i.e., in the exact diameter required for the plant and which an outer periphery defined by un-cut, bent wires over the entire circumference of the net, so that there is no accumulation of waste for subsequent reprocessing as in the usual circular cutting of woven nets.

The nets produced in accordance with the present invention provide for an advantageous catalysts method such as a method of catalytically oxidizing ammonia by passing of ammonia gas through the gas permeable net or for the recovery of platinum which volatilize in the catalytic oxidation of ammonia.

The values listed below illustrate possible percentage by weight combinations for various alloys which are suitable for use in the present invention:

| a) | 90 Pt | 10 Rh | | f) | 95 Pd | 5 Ni | |
|---|---|---|---|---|---|---|---|
| b) | 92 Pt | 8 Pd | | g) | 97 Pd | 3 Ni | |
| c) | 90 Pt | 5 Pd | 5 Rh | h) | 92 Pd | 8 Cu | |
| d) | 88 Pt | 5 Pd | 7 Rh | i) | 85 Pd | 15 Cu | |
| e) | 95 Pt | 5 Rh | | j) | 86 Pd | 10 Cu | 4 Ni. |

The following Examples are intended to illustrate the invention:

EXAMPLE 1

A flat knitting machine with a division of 2.12 mm (12 needles per inch) is used for the production of a 2300 mm diameter round catalyst net for the oxidation of ammonia. The net is knitted from a 76 μm diameter wire of 90 platinum/10 rhodium, the wire being used in doubled form. It has a tensile strength of 930 N/mm$^2$ and an elastic limit of 1%. The loop length during knitting is 2.8 mm. A net having a weight per unit area of approximately 600 g/m$^2$ is obtained. The net produces excellent results when used in ammonia oxidation plants.

EXAMPLE 2

A two-bed flat knitting machine with a divisional 2.54 mm is used for the production of circular recovery nets for the oxidation of ammonia. The wire (composition: 95 palladium/5 nickel) has a diameter of 90 μm, a tensile strength of 920 N/mm and an elastic limit of 1%. The sinking depth or loop length during knitting is 3.9 mm. A 3700 mm diameter net with a weight per unit area of 500 g/m$^2$ is obtained when the wire is used in doubled form. The recovery level of platinum metals in ammonia oxidation plants is at least as high as that achieved with corresponding woven nets.

What is claimed is:

1. A process for the production of gas permeable nets of noble metals for catalytic processes, comprising:
   knitting wires on a knitting machine with the wires being free of auxiliary thread support during knitting and wherein the wires are formed of a material which is an alloy of;
   a) platinum and rhodium containing 4 to 12% by weight of rhodium,
   b) platinum, palladium and rhodium containing 4 to 12% by weight of palladium and rhodium,
   c) palladium and nickel containing 2 to 15% nickel,
   d) palladium and copper containing 2 to 15% by weight of copper, or
   e) palladium, nickel and copper containing 2 to 15% by weight of nickel and copper, and
   wherein the wires have a diameter of 50 to 120 μm, a tensile strength of 900 to 1500 N/mm$^2$, an elastic limit of 0.5 to 3% and the knitting machine has a gauge of 1.81 to 3.63 mm.

2. A process as recited in claim 1, wherein the knitting of the wires includes knitting the wires on a flat knitting machine having a loop length setting for forming loop lengths of between 2 and 6 mm.

3. A process as recited in claim 2, wherein the knitting of wires includes knitting the wires on a two-bed flat knitting machine.

4. A process as recited in claim 1, wherein the knitting of wires includes knitting the wires so as to form a net with a weight per unit area of 300 g/m$^2$ or more.

5. A process as recited in claim 1, wherein the wires are knitted so as to form a net which has a circular outer periphery.

6. A process as recited in claim 1, wherein the knitting of the wires includes knitting wires which are in doubled form.

7. A structure, comprising:
a knitted set of wires with the wires being formed of an alloy of:
a) platinum and rhodium containing 4 to 12% by weight of rhodium,
b) platinum, palladium and rhodium containing 4 to 12% by weight of palladium and rhodium,
c) palladium and nickel containing 2 to 15% nickel,
d) palladium and copper containing 2 to 15% by weight of copper, or
e) palladium, nickel and copper containing 2 to 15% by weight of nickel and copper, and
wherein the wires have a diameter of 50 to 120 μm, a tensile strength of 900 to 1500 N/mm² and an elastic limit of 0.5 and 3%, and wherein the net is formed so as to have a loop width of 1.81 to 3.63 mm.

8. A structure as recited in claim 7, wherein the net has a loop length of 2 to 6 mm.

9. A structure as recited in claim 8, wherein said net has a weight per unit area of 300 g/m² or more.

10. A structure as recited in claim 7, wherein said net has a weight per unit area of 300 g/m² or more.

11. A structure as recited in claim 7, wherein said net is circular in shape with a selvedge edge provided over essentially the entire periphery of said net.

12. A structure as recited in claim 7, wherein said net is formed of knitted wires in doubled form.

13. A structure as recited in claim 7, wherein the knitted net is formed of an alloy selected from the group consisting of:
a) 90% Pt and 10% Rh
b) 92% Pt and 8% Pd
c) 90% Pt, 5% Pd and 5% Rh
d) 88% Pt, 5% Pd and 7% Rh
e) 95% Pt and 5% Rh
f) 95% Pd and 5% Ni
g) 97% Pd and 3% Ni
h) 92% Pd and 8% Cu
i) 85% Pd and 15% Cu
J) 86% Pd, 10% Cu and 4% Ni.

14. A gas permeable net which is formed by:
knitting wires on a knitting machine with the wires being free of auxiliary thread support during knitting and wherein the wires are formed of a material which is an alloy of:
a) platinum and rhodium containing 4 to 12% by weight of rhodium,
b) platinum, palladium and rhodium containing 4 to 12% by weight of palladium and rhodium,
c) palladium and nickel containing 2 to 15% nickel,
d) palladium and copper containing 2 to 15% by weight of copper, or
e) palladium, nickel and copper containing 2 to 15% by weight of nickel and copper, and
wherein the wires have a diameter of 50 to 120 μm, a tensile strength of 900 to 1500 N/mm² and an elastic limit of 0.5 and 3%, and wherein the net is formed so as to have a loop width of 1.81 to 3.63 mm.

15. A net as recited in claim 14, wherein the net has a loop length of 2 to 6 mm.

16. A net as recited in claim 14, wherein said net has a weight per unit area of 300 g/mm² or more.

17. A net as recited in claim 14, wherein said net is circular in shape with a selvedge edge provided over essentially the entire circumference of said net.

18. A net as recited in claim 14, wherein said net is formed of knitted wires in doubled form.

19. A catalytic process for oxidizing ammonia which comprises:
passing ammonia and air through a gas permeable net which comprises knitted wires formed of an alloy of:
a) platinum and rhodium containing 4 to 12% by weight of rhodium,
b) platinum, palladium and rhodium containing 4 to 12% by weight of palladium and rhodium,
c) palladium and nickel containing 2 to 15% by weight of nickel,
d) palladium and copper containing 2 to 15% by weight of copper, or
e) palladium, nickel and copper containing 2 to 15% by weight of nickel and copper, and
wherein the wires have a diameter of 50 to 120 μm, a tensile strength of 900 to 1500 N/mm² and an elastic limit of 0.5 and 3%, and wherein said net has a loop width of 1.81 to 3.63.

20. A method as recited in claim 19, wherein the passing of gas through the gas permeable net includes forcing ammonia gas past a net having a loop length of 2 to 6 mm.

21. A process for the production of gas permeable nets of noble metals for catalytic processes, comprising:
knitting wires on a knitting machine with the wires being free of auxiliary support during knitting and wherein the wires are formed of a material which is an alloy of;
a) platinum and rhodium containing 4 to 12% by weight of rhodium,
b) platinum, palladium and rhodium containing 4 to 12% by weight of palladium and rhodium,
c) palladium and nickel containing 2 to 15% by nickel,
d) palladium and copper containing 2 to 15% by weight of copper, or
e) palladium, nickel and copper containing 2 to 15% by weight of nickel and copper, and
wherein the wires have a diameter of 50 to 120 μm, a tensile strength of 900 to 1500 N/mm² and an elastic limit of 0.5 and 3% and wherein the net is knitted so as to have a weight per unit area of 300 g/m² or more.

22. A structure, comprising:
a knitted net of wires with the wires being formed of an alloy of:
a) platinum and rhodium containing 4 to 12% by weight of rhodium,
b) platinum, palladium and rhodium containing 4 to 12% by weight of palladium and rhodium,
c) palladium and nickel containing 2 to 15% nickel,
d) palladium and copper containing 2 to 15% by weight of copper, or
e) palladium, nickel and copper containing 2 to 15% by weight of nickel and copper, and
wherein the wires have a diameter of 50 to 120 μm, a tensile strength of 900 to 1500 N/mm² and an elastic limit of 0.5 and 3%, and the net has a weight per unit area of 300 g/m² or more.

23. A gas permeable net which is formed by:
knitting wires on a knitting machine with the wires being free of auxiliary thread support during knitting and wherein the wires are formed of a material which is an alloy of:
a) platinum and rhodium containing 4 to 12% by weight of rhodium,
b) platinum, palladium and rhodium containing 4 to 12% by weight of palladium and rhodium,
c) palladium and nickel containing 2 to 15% nickel,
d) palladium and copper containing 2 to 15% by weight of copper, or
e) palladium, nickel and copper containing 2 to 15% by weight of nickel and copper, and wherein the wires have a diameter of 50 to 120 $\mu$m, a tensile strength of 900 to 1500 N/mm$^2$ and an elastic limit of 0.5 and 3%, and wherein said net has a weight per unit area of 300 g/m$^2$ or more.

24. A catalytic process for oxidizing ammonia which comprises:
passing ammonia and air through a gas permeable net which comprises knitted wires formed of an alloy of:
a) platinum and rhodium containing 4 to 12% by weight of rhodium,
b) platinum, palladium and rhodium containing 4 to 12% by weight of palladium and rhodium,
c) palladium and nickel containing 2 to 15% nickel,
d) palladium and copper containing 2 to 15% by weight of copper, or
e) palladium, nickel and copper containing 2 to 15% by weight of nickel and copper, and wherein the wires have a diameter of 50 to 120 $\mu$m, a tensile strength of 900 to 1500 N/mm$^2$ and an elastic limit of 0.5 and 3% and wherein the net has a weight per unit area of 300 g/m$^2$ or more.

25. A process as recited in claim 1 wherein knitting the wires includes knitting wires which include palladium.

26. A structure as recited in claim 7 wherein the wires include palladium.

27. A gas permeable net as recited in claim 14 wherein the wires include palladium.

28. A process as recited in claim 19 wherein said passing of ammonia and air through a gas permeable net includes passing ammonia and air through a net having a weight per unit area of 300 g/m$^2$ or more.

29. A process as recited in claim 19 wherein passing ammonia and air through said net includes passing ammonia and air through a net containing palladium.

* * * * *